United States Patent
Heston et al.

(10) Patent No.: US 9,618,051 B2
(45) Date of Patent: Apr. 11, 2017

(54) METHOD AND APPARATUS FOR MOUNTING A MACHINE ELEMENT ONTO A SHAFT

(71) Applicant: Fenner U.S., Inc., Manheim, PA (US)

(72) Inventors: Stephen F. Heston, East Petersburg, PA (US); Jeremy Bigler, Landisville, PA (US); Eric S. Mosser, Palmyra, PA (US); Francis B. Fatato, Exton, PA (US)

(73) Assignee: Fenner U.S., Inc., Manheim, PA (US)

( * ) Notice: Subject to any disclaimer, the term of this patent is extended or adjusted under 35 U.S.C. 154(b) by 642 days.

(21) Appl. No.: 14/099,405

(22) Filed: Dec. 6, 2013

(65) Prior Publication Data

US 2014/0161515 A1    Jun. 12, 2014

Related U.S. Application Data

(60) Provisional application No. 61/734,318, filed on Dec. 6, 2012.

(51) Int. Cl.
   *F16D 1/09*    (2006.01)
   *F16D 1/094*    (2006.01)

(52) U.S. Cl.
   CPC ............ *F16D 1/094* (2013.01); *Y10T 403/67* (2015.01); *Y10T 403/7054* (2015.01); *Y10T 403/7056* (2015.01); *Y10T 403/7058* (2015.01)

(58) Field of Classification Search
   CPC . F16D 1/09; F16D 1/093; F16D 1/094; Y10T 403/7054; Y10T 403/70586; Y10T 403/7058; Y10T 403/7052; Y10T 403/7067; Y10T 403/7069
   See application file for complete search history.

(56) References Cited

U.S. PATENT DOCUMENTS

| | | | |
|---|---|---|---|
| 1,687,777 A | 10/1928 | McMurtrie et al. | |
| 2,930,642 A | 3/1960 | Howlett | |
| 3,003,149 A | 10/1961 | Grashow | |
| 4,202,644 A | 5/1980 | Soussloff | |

(Continued)

FOREIGN PATENT DOCUMENTS

| | | |
|---|---|---|
| DE | 3444608 | 6/1986 |
| EP | 318977 | 9/1993 |

(Continued)

*Primary Examiner* — Jonathan Masinick
(74) *Attorney, Agent, or Firm* — Stephen H. Eland; Dann, Dorfman, Herrell & Skillman

(57) ABSTRACT

A mounting device for coaxially anchoring a machine element upon a rotary shaft is provided. The device fits between the interior bore of the machine element and the cylindrical surface of the shaft and is effective to position the element at any desired position longitudinally of the shaft and at any angular position circumferentially of the shaft. The device has inner and outer sleeves, the mating surfaces of which are similarly tapered so that relative axial displacement of the sleeves affects expansion and contraction of the interior bore and external surface of the combined elements. Rotation of a threaded nut at one end of the device effects the relative axial displacement of the inner and outer sleeves to afford expansion and contraction of the sleeves without excessively straining the material of the sleeves or the nut.

20 Claims, 5 Drawing Sheets

(56) References Cited

U.S. PATENT DOCUMENTS

| | | | |
|---|---|---|---|
| 4,345,851 A | 8/1982 | Soussloff | |
| 4,367,053 A | 1/1983 | Stratienko et al. | |
| 4,543,704 A | 10/1985 | Soussloff | |
| 4,598,443 A | 7/1986 | Ostling et al. | |
| 4,600,334 A | 7/1986 | Soussloff | |
| 4,615,640 A | 10/1986 | Hosokawa | |
| 4,623,277 A | 11/1986 | Wayne et al. | |
| 4,824,281 A | 4/1989 | Katsube | |
| 5,009,539 A | 4/1991 | Muellenberg | |
| 5,067,846 A | 11/1991 | Staniszewski | |
| 5,067,847 A | 11/1991 | Muellenberg | |
| 5,072,072 A | 12/1991 | Bawa et al. | |
| 5,161,928 A | 11/1992 | Burdick, Jr. | |
| 5,308,183 A | 5/1994 | Stegeman et al. | |
| 5,374,135 A | 12/1994 | Folsom et al. | |
| 5,474,403 A | 12/1995 | Hetrich | |
| 5,695,297 A * | 12/1997 | Geib | F16B 7/149 403/369 |
| 6,000,875 A | 12/1999 | Staniszewski | |
| 6,261,185 B1 | 7/2001 | Peterson et al. | |
| 6,357,958 B1 | 3/2002 | Geib et al. | |
| 6,361,243 B1 | 3/2002 | Geib | |
| 2005/0023226 A1 | 2/2005 | Bastick et al. | |
| 2005/0089364 A1 | 4/2005 | Geib | |
| 2005/0220534 A1* | 10/2005 | Ober | B65H 75/08 403/370 |
| 2008/0144986 A1* | 6/2008 | Wajda | F16C 35/073 384/538 |

FOREIGN PATENT DOCUMENTS

| | | |
|---|---|---|
| EP | 799389 | 7/2000 |
| JP | 56080524 | 7/1981 |
| WO | 90/01387 | 2/1990 |

* cited by examiner

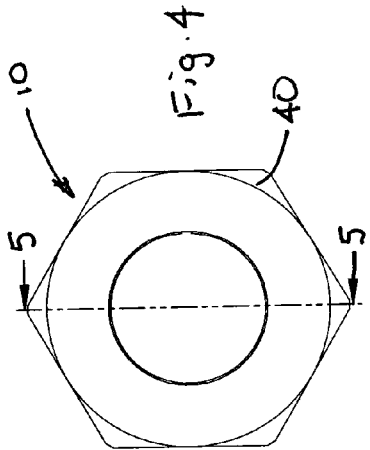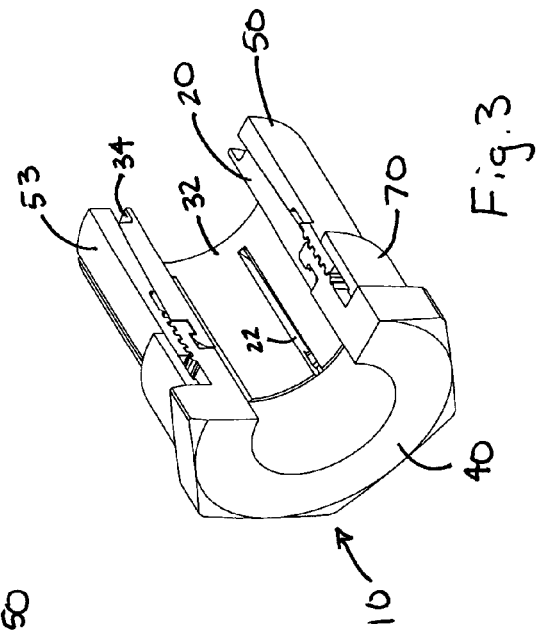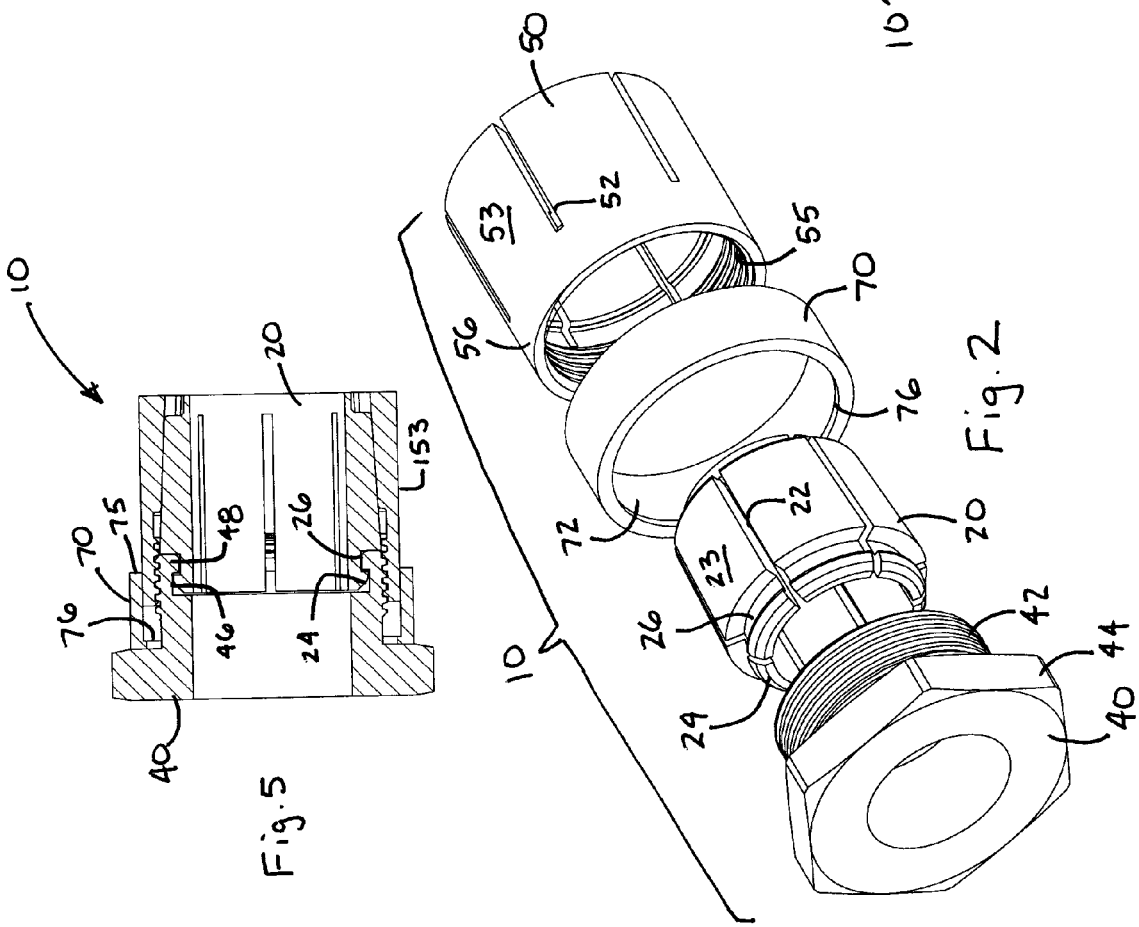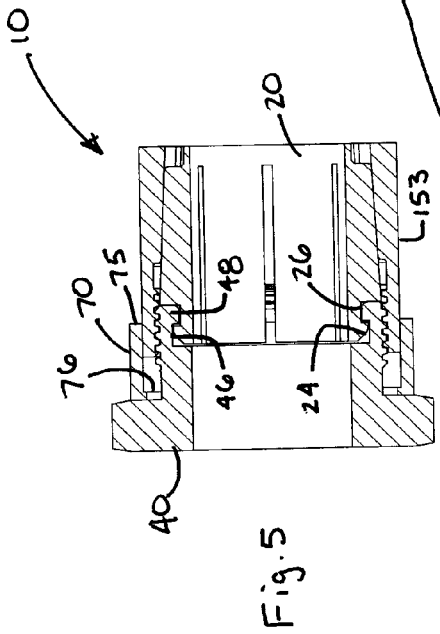

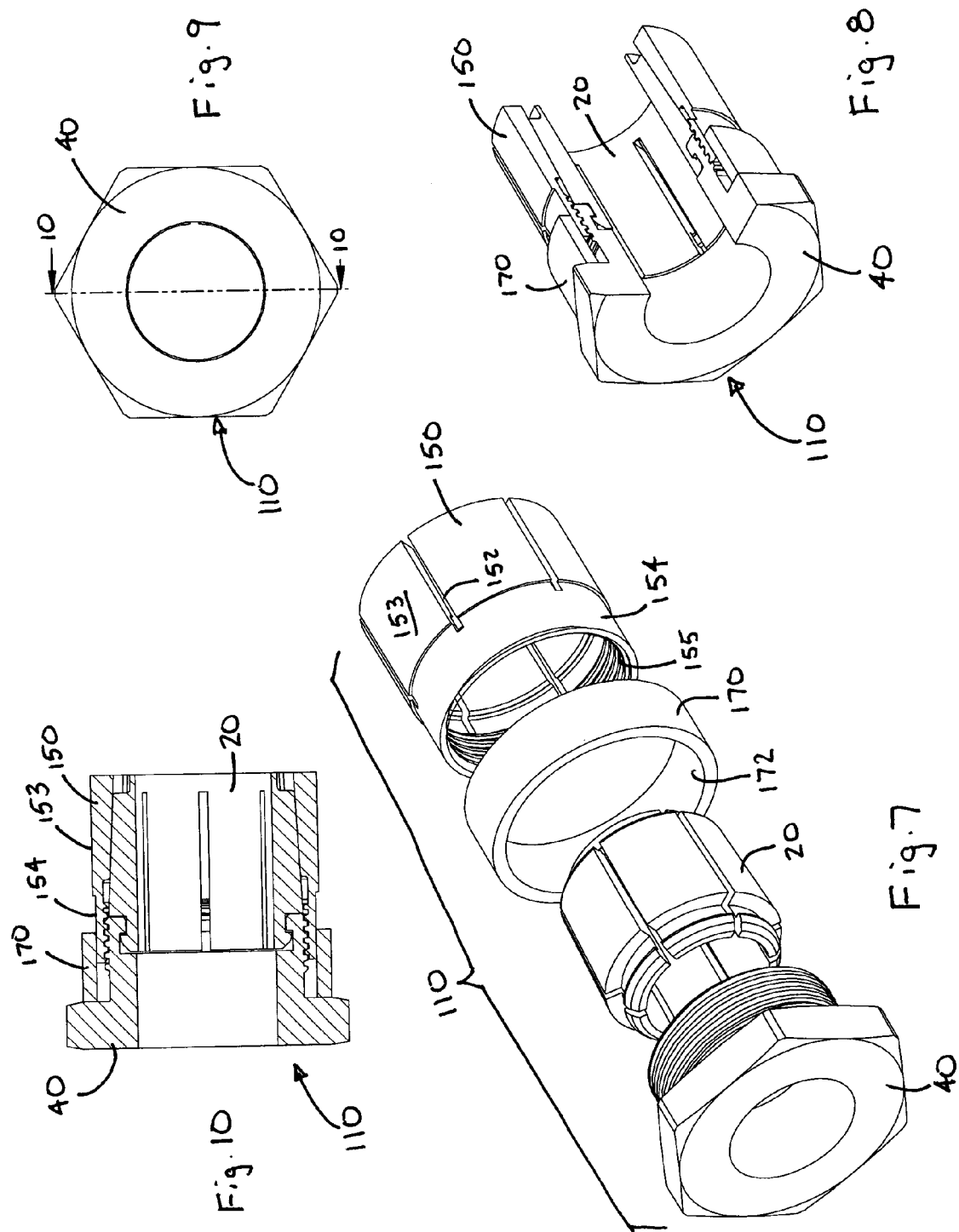

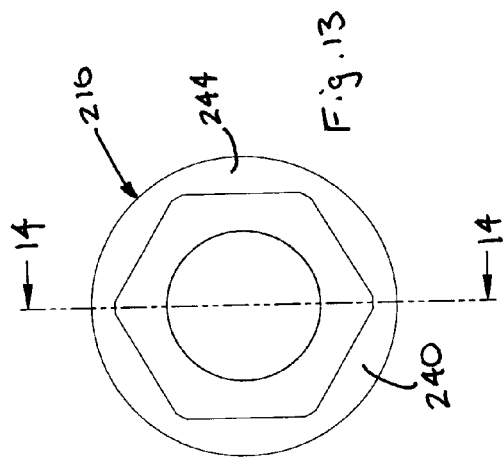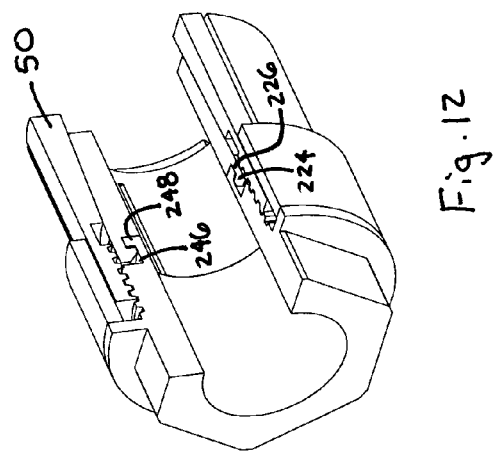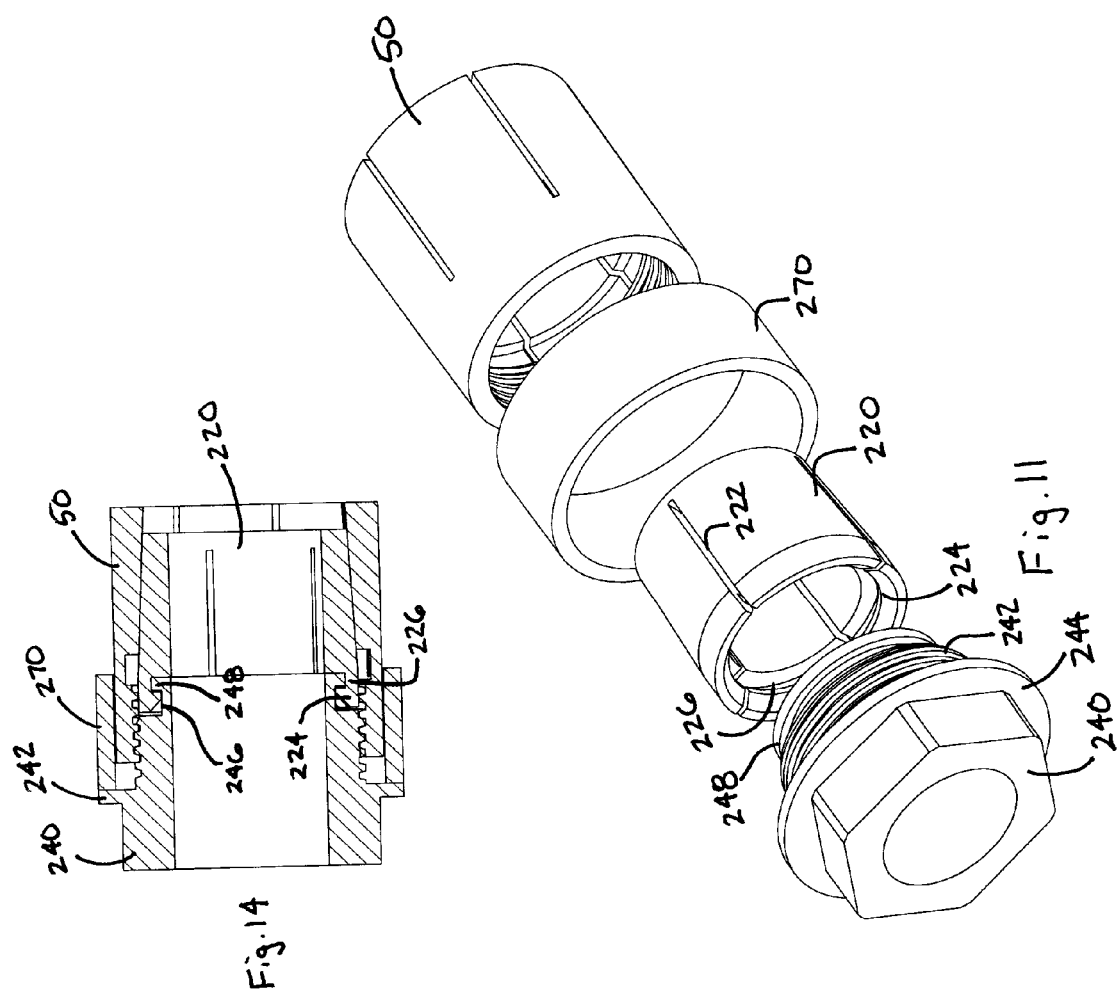

METHOD AND APPARATUS FOR MOUNTING A MACHINE ELEMENT ONTO A SHAFT

RELATED APPLICATION

This application claims priority to U.S. Provisional Application No. 61/734,318 filed Dec. 6, 2012. The entire disclosure of the foregoing application is hereby incorporated herein by reference.

FIELD OF THE INVENTION

The present invention relates to a mounting device for mounting a machine element on a shaft. The device provides an improved mounting device for mounting machine elements permitting infinitely-variable adjustment of the machine element on the shaft, both axially of the shaft and circumferentially, while maintaining the machine element at a fixed, axial position after being mounting on the shaft.

BACKGROUND OF THE INVENTION

The use of devices for mounting machine elements, such as pulleys and gears, upon a shaft is well-known. One difficulty is that the known devices for mounting a machine element upon a cylindrical shaft are cumbersome to use. For example, some devices require assembly of multiple pieces and adjustment of several screws, and other devices require modification of the shaft on which the machine element is mounted.

Another difficulty frequently encountered relates to the need for precise positioning of the machine elements circumferentially on the shaft when the machine element is mounted upon the shaft. Specifically, it is desirable to position the machine element at a particular circumferential position and maintain the element at such position after the element is attached to the shaft. In addition, it is desirable to allow for the infinitely-variable adjustment of the machine element prior to attaching the element to the shaft. One known device is disclosed in U.S. Pat. No. 5,695,297. Although such devices have overcome issues of previous devices, issues remain with providing an easily installed mounting device in certain applications.

SUMMARY OF THE INVENTION

In accordance with the present invention, a mounting device is provided that is easy to use. The device enables the mounting of a machine element by simply tightening a single nut to effect frictional engagement and also to ensure disengagement by loosening the same nut. The nut operates to positively release the frictional engagement produced by tightening the nut.

The present invention also solves the difficulty of maintaining the machine element at a fixed position. Once mounted, the device retains the machine element at a fixed, axial position relative to the shaft.

The present invention provides a device for coaxially mounting a machine element having a bore upon a shaft. The mounting device includes an outer sleeve for engaging the machine element and an inner sleeve for engaging the shaft. The inner and outer sleeves have cooperating tapered surfaces so that displacing the inner sleeve relative to the outer sleeve creates radial forces that lock the outer sleeve against the bore of the machine element and the inner sleeve against the shaft. A nut connected with at least one of the inner and outer sleeve is operable to displace the inner sleeve relative to the outer sleeve.

According to one aspect, the present invention provides a device for coaxially mounting a machine element having a bore upon a shaft. The device includes a nut, an inner sleeve and an outer sleeve. The nut includes an enlarged head, a first connector and a threaded portion overlying at least a portion of the first connector. The outer sleeve engages the machine element and it includes an external surface configured to cooperate with the bore of the machine element, a tapered internal surface and at least one axial slot extending longitudinally along the outer sleeve to permit expansion of the external surface of the outer sleeve. The outer sleeve also includes an internally threaded portion configured to threadedly engage the threads of the nut. The inner sleeve encircles the shaft and it includes a tapered external surface corresponding in angle of taper to the tapered internal surface of the outer sleeve, an interior bore corresponding in diameter to the shaft, and a second connector cooperable with the first connector to connect the inner sleeve with the nut. The connection between the nut and the inner sleeve impedes substantial axial displacement of the inner sleeve relative to the nut while allowing rotation of the outer sleeve relative to the inner sleeve. The enlarged head of the nut is larger than the outer sleeve so that the enlarged head can abut a sidewall of the machine element when the machine element is mounted on the device. Rotating the nut in a first direction displaces the outer sleeve rearwardly relative to the nut, which displaces the major diameter of the external surface of the inner sleeve toward the minor diameter of the outer sleeve internal surface, thereby causing the inner sleeve to contract against the shaft and the outer sleeve to expand against the bore of the machine element. Rotating the nut in a second direction displaces the outer sleeve forwardly relative to the nut, thereby loosening the inner sleeve from the shaft and the outer sleeve from the bore of the machine element.

According to a second aspect, the present invention provides a device for coaxially mounting a machine element having a bore upon a shaft. The device includes a one-piece inner sleeve for encircling the shaft and having a frustoconical external surface, an interlock at a first end, and a circumferential or annular recess at a second end remote from the interlock. The inner sleeve is connected with a nut having a threaded portion and a second interlock configured to cooperate with the first interlock to substantially permanently connect the inner sleeve with the nut to allow rotation of the inner sleeve relative to the nut while substantially impeding axial movement of the inner sleeve relative to the nut. The nut further includes an enlarged head. The device also includes an outer sleeve for engaging the machine element. The outer sleeve includes a threaded portion configured to threadedly engage the nut, a frustoconical internal surface corresponding in angle of taper to the tapered external surface of the inner sleeve and an external surface corresponding to the bore of the machine element. The device may also include a spacer sleeve having an internal surface correlating with an outer surface of the outer sleeve so that the spacer sleeve fits over the outer sleeve to position the device relative to the machine element.

Accordingly to yet another aspect, the present invention provides a method for mounting a machine element onto a shaft. According to the method, an inner sleeve is provided, which has a tapered external surface and a bore that is cooperable with the shaft. An outer sleeve is provided, which has an internal bore that is tapered to cooperate with the external surface of the inner sleeve, a threaded portion, and an external surface cooperable with the bore of the machine element. A nut is provided, which has an enlarged head and a threaded portion that is cooperable with the threaded portion of the outer sleeve. The inner sleeve is connected to the nut to impede substantial axial displacement of the inner sleeve relative to the nut while allowing rotation of the nut relative to the inner sleeve. A positioning sleeve is positioned over a portion of the outer sleeve. The inner and outer sleeves are positioned between the shaft and the bore of the machine element so that a rearward edge of the positioning sleeve abuts the enlarged head of the nut and a forward edge of the positioning sleeve abuts a sidewall of the machine element without extending into the bore of the machine element. The nut is rotated in a forward direction to drive the outer sleeve axially relative to the nut and the inner sleeve so that the tapered surface of the inner sleeve wedges apart the outer sleeve to connect the outer sleeve to the machine element and the inner sleeve to the shaft.

BRIEF DESCRIPTION OF THE DRAWINGS

The foregoing summary, as well as the following detailed description of the preferred embodiments of the present invention, will be better understood when read in conjunction with the appended drawings, in which:

FIG. 2 is an exploded perspective view of the mounting device illustrated in FIG. 1.

FIG. 3 is a perspective broken away view of the mounting device illustrated in FIG. 1.

FIG. 4 is an end view of the mounting device illustrated in FIG. 1.

FIG. 5 is a sectional view of the mounting device illustrated in FIG. 4 taken along the line 5-5.

FIG. 7 is an exploded perspective view of the mounting device illustrated in FIG. 6.

FIG. 8 is a perspective broken away view of the mounting device illustrated in FIG. 6.

FIG. 9 is an end view of the mounting device illustrated in FIG. 6.

FIG. 10 is a sectional view of the mounting device illustrated in FIG. 9 taken along the line 10-10.

FIG. 11 is an exploded perspective view of a second alternate mounting device.

FIG. 12 is a perspective broken away view of the mounting device illustrated in FIG. 11.

FIG. 13 is an end view of the mounting device illustrated in FIG. 11.

FIG. 14 is a sectional view of the mounting device illustrated in FIG. 13 taken along the line 14-14.

DETAILED DESCRIPTION OF THE PREFERRED EMBODIMENTS

Figure 1:
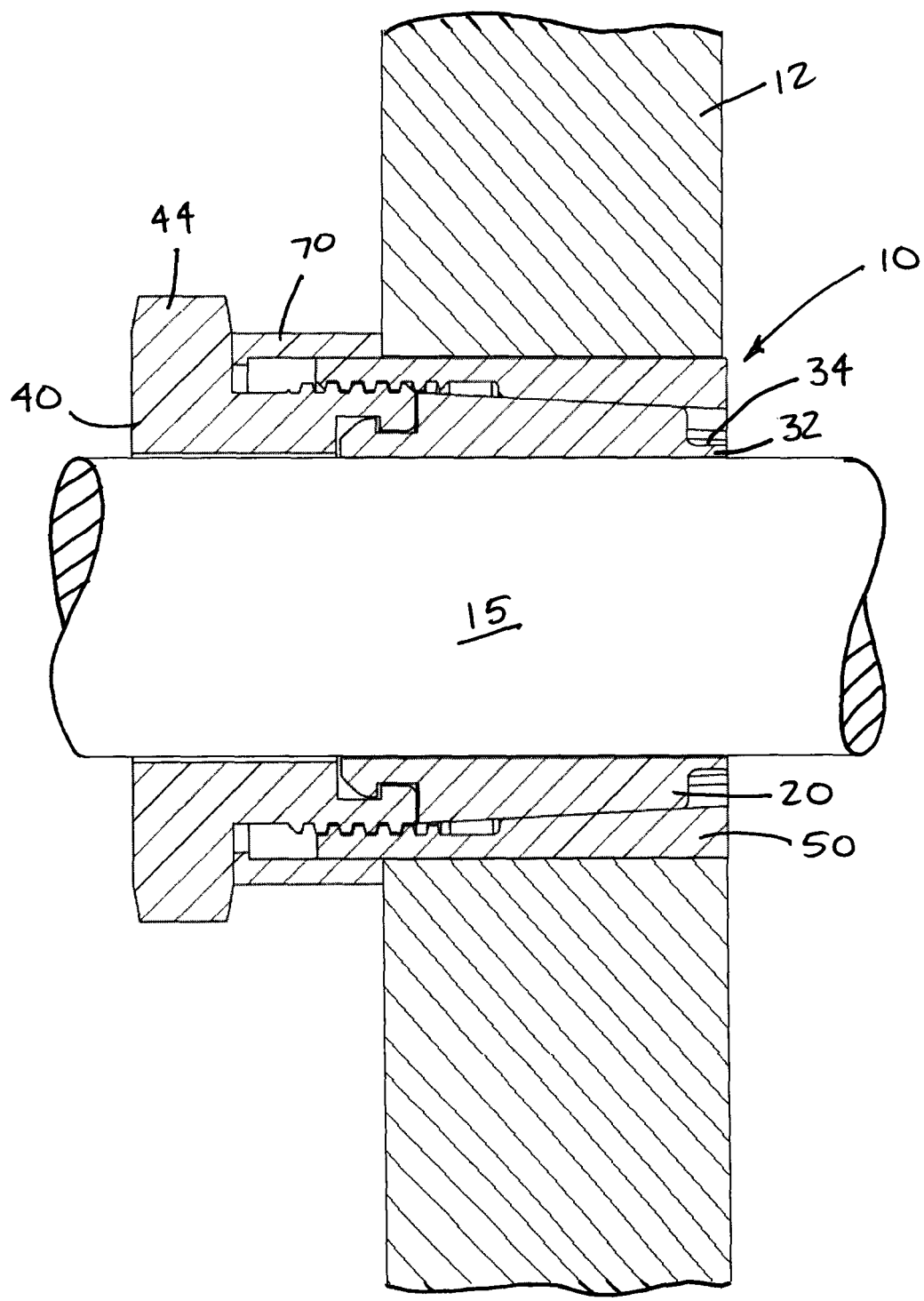
FIG. 1 is an enlarged sectional view of a mounting device illustrated in combination with a machine element and a shaft.
Figure 6:
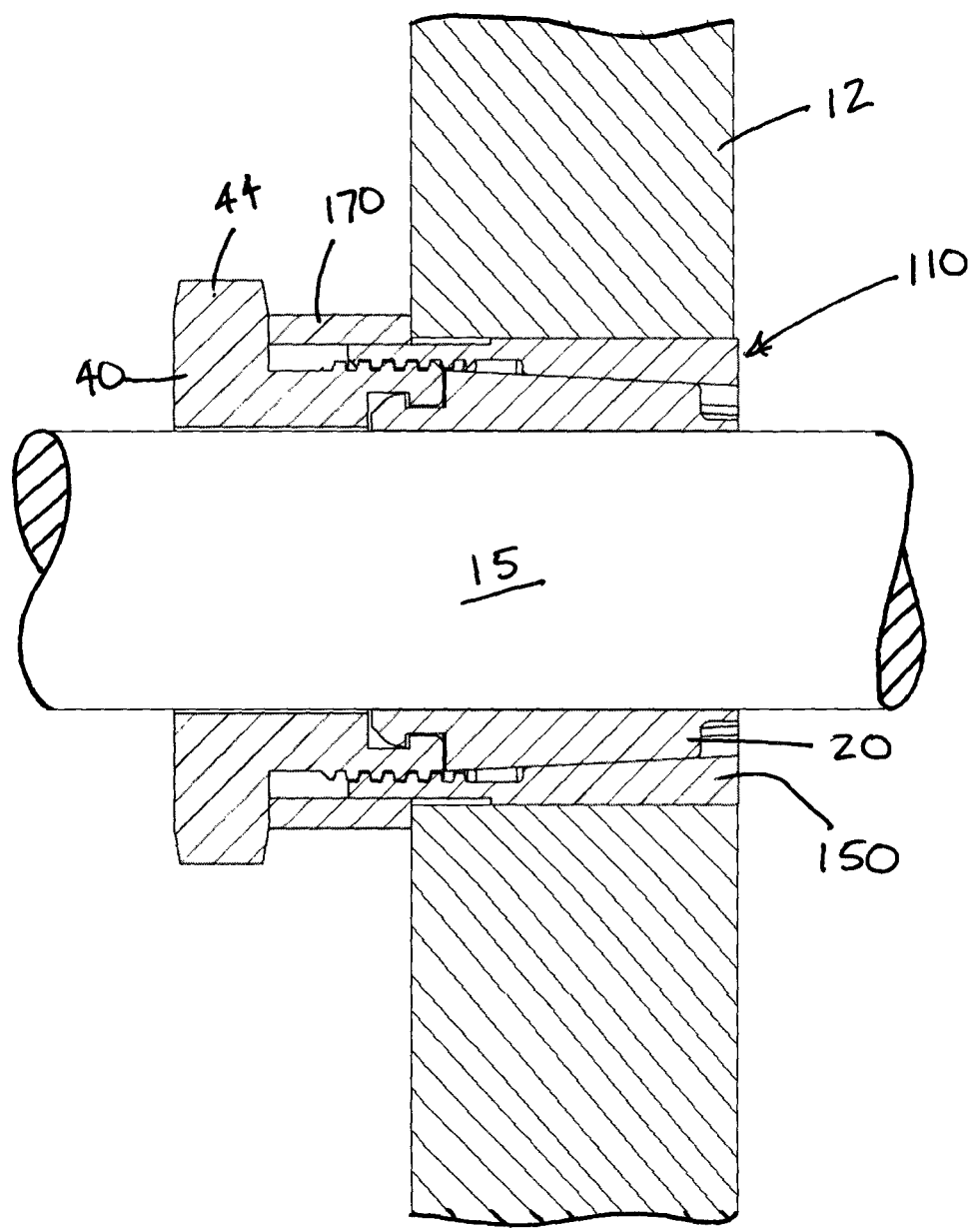
FIG. 6 is an enlarged sectional view of an alternate mounting device illustrated in combination with a machine element and a shaft.

Referring now to the drawings and to FIGS. 1-5 specifically, a mounting device is designated generally 10. The mounting device is designed to mount a first element, such as a machine element 12, onto a second element, such as a shaft 15. The machine element 12 has a bore that engages the external surface of the mounting device 10, and the shaft 15 has a surface that engages the internal surface of the mounting device 10. In the present instance, the machine element 12 has a smooth tapered bore 13 whose axis coincides with the axis of the cylindrical surface of the shaft 15. The mounting device is designed to be positioned between the machine element 12 and the shaft 15 and to be expanded to securely anchor the machine element 12 onto the shaft at a desired position axially of the shaft and an angular position circumferentially of the shaft.

The mounting device 10 includes an inner sleeve 20, an outer sleeve 50, and a locking nut 40. The external surface 23 of the inner sleeve 20 is formed to cooperate with the inner surface of the outer sleeve as discussed further below. Specifically, the forward end of the inner sleeve has a frustoconical tapered external surface 23. The frustoconical surface 23 is configured so that the minor diameter is adjacent the forward edge of the inner sleeve and the major diameter is spaced rearwardly from the forward edge. In other words, the largest diameter of the frustoconical surface 23 is located intermediate the ends of the inner sleeve and the surface tapers inwardly as the surface extends toward the forward end of the inner sleeve. The external surface of the sleeve also includes an interlock for connecting the inner sleeve with the locking nut 40.

In the present instance, the interlock of the inner sleeve is configured to connect the inner sleeve to the nut so as to allow the inner sleeve to rotate relative to the nut while substantially impeding axial movement of the inner sleeve relative to the nut. For example, the interlock may comprise a circumferential flange 24 that extends around the circumference of the inner sleeve 20, projecting radially outwardly. Further, the interlock may comprise a circumferential groove 26 that extends around the circumference of the inner sleeve adjacent the circumferential flange 24.

The inner sleeve 20 is tubular in form having an internal bore that cooperates with the external surface of the shaft 15. Specifically, if the external surface of the shaft is tapered or frustoconical, the internal surface of the inner sleeve has a cooperating tapered or frustoconical surface. In the present instance, the shaft is cylindrical, and the inner sleeve 20 has a cylindrical bore with a diameter that corresponds to the diameter of the shaft 15. Preferably, the bore of the inner sleeve is slightly greater in diameter than the shaft 15 to permit free sliding movement of the inner sleeve 20 on the shaft 15 both axially and circumferentially.

As discussed further below, the inner sleeve engages the shaft 15 by contracting so that the inner sleeve grips or clamps down onto the shaft. For this purpose, the inner sleeve 20 is formed into a plurality of segments by slots 22 that extend longitudinally through the sleeve from the forward end. The slots 22 allow radial deflection of the inner sleeve as the mounting device is tightened or released. The slots terminate along a line spaced inwardly from the forward end of the inner sleeve 20. In this way, the forward portion of the inner sleeve 20 may form an unsplit solid continuous ring portion. However, in the present instance, the inner sleeve is made from steel and provided with six equally spaced slots, one of which extends through the entire length of the inner sleeve. It will be recognized, however, that the number of slots, as well as the width, length and spacing of the slots can be varied to achieve the desired flexibility.

The inner sleeve 20 is adapted to fit within the outer sleeve 50, which is a unitary sleeve having a plurality of axial slots 52 extending from the rearward end of the outer sleeve. The axial slots 52 permit radial deflection of the outer sleeve 50 as the mounting device 10 is tightened and released. The outer surface of the outer sleeve 50 has an engaging surface 53 that is configured to cooperate with the internal bore of the machine element 12. For example, the machine element bore may be cylindrical and the engaging surface 53 of the outer sleeve may correspondingly be generally cylindrical. Alternatively, the engaging surface 53 of the outer sleeve may be frustoconical to cooperate with a machine element having a tapered bore. In addition, preferably the engaging surface 53 is sufficiently smaller than the bore of the machine element to permit free sliding movement between the machine element and the outer sleeve when the mounting device is not tightened.

As shown in FIG. 1-5, the inner surface of the outer sleeve 50 is configured to cooperate with the external surface 23 of the inner sleeve. The inner and outer sleeves have mating tapered surfaces that cooperate to wedge the outer sleeve outwardly while contracting the inner sleeve inwardly. More specifically, the inner surface of the outer sleeve 50 tapers toward the forward end at the same angle of taper as the frustoconical portion 23 of the inner sleeve 20. In other words, the bore of the outer sleeve is tapered so that the minor diameter of the bore is adjacent the forward end of the outer sleeve and the major diameter of the bore is spaced rearwardly from the forward end. In this way, when the outer sleeve 50 is displaced rearwardly relative to the inner sleeve 20 (i.e. from right to left in FIG. 1), the confronting tapered surfaces of the inner and outer sleeves cooperate to expand the external cylindrical surface of the outer sleeve and contract the internal cylindrical surface of the inner sleeve.

In the present instance, the outer sleeve comprises a threaded portion 55 configured to threadedly engage the threaded portion 42 of the lock nut 40. Specifically, the outer sleeve comprises an internally threaded section 55 adjacent the rearward end of the outer sleeve. To affect this displacement, as illustrated in FIGS. 1-5, the nut 40 has external threads 42 that threadedly engage the threads 55 of the outer sleeve 50. Rotating the nut 40 displaces the outer sleeve axially relative to the nut. Accordingly, since the inner sleeve 20 is connected to the nut, the outer sleeve is displaced relative to the inner sleeve as the nut is rotated.

The nut 40 has an internal bore that is larger than the diameter of the shaft 15. In addition, preferably the outer diameter of the nut is larger than the outer diameter of the outer sleeve 50. More specifically, the nut 40 has an enlarged head 44 that extends radially outwardly so that the diameter of the head is larger than the bore of the machine element. Therefore, the outer diameter of the head 44 is larger than the largest diameter of the outer sleeve 50. In this way, the head 44 of the nut 40 is configured so that if the head of the nut is abutted against the machine element, the head operates as a stop to impede displacement of the machine element relative to the nut. Additionally, as discussed above, the nut is connected to the inner sleeve in a manner that substantially impedes axial displacement of the inner sleeve relative to the nut. Therefore when the head 44 of the nut 40 abuts the side of the machine element, the head operates as a stop impeding axial displacement of the machine element relative to the inner sleeve. The mating tapers of the inner and outer sleeve are configured so that displacement of the outer sleeve relative to the inner sleeve imparts greater radial force than axial force. Therefore, the forces created by the cooperating tapers cause greater clamping force than axial forces. Because of this, tightening the locking nut causes the inner sleeve to clamp down on the shaft 15 with sufficient force to impede axial displacement of the inner sleeve relative to the shaft in response to the axial forces caused by the mating tapers when the inner and out sleeves are displaced relative to one another to tighten the device.

As discussed above, the nut 40 is connected to the inner sleeve 20 to impede substantial axial displacement between the nut and the inner sleeve. To provide such a connection, the nut 40 comprises an interlock configured to cooperate with the interlock of the inner sleeve 20 to provide a substantially irreversible or permanent connection that allows the inner sleeve to rotate relative to the nut while substantially impeding axial displacement of the inner sleeve relative to the nut. In the present instance, the nut comprises an annular flange 48 and an annular groove 46 configured to cooperate with the circumferential flange 24 and circumferential groove 26 of the inner sleeve 20. Preferably, the forward and rearward sidewalls of the groove 46 are substantially perpendicular to the common axis of the assembly. In the present instance, the groove 46 and flange 48 are formed inside the nut 40 at the forward end of the nut. In this way, the threaded portion 42 of the nut overlies groove 46 and flange 48 as shown in FIGS. 1 and 5. In this way, the interlock between the nut and the inner sleeve is coextensive with at least a portion of the threaded portion 42 of the nut. More particularly, in the present instance, the entire axial length of the interlocking surfaces between the inner sleeve and the nut are coextensive with at least a portion of the threaded section 42 of the nut 40.

The interlock between the inner sleeve 20 and the nut 40 operates as follows. The external flange 24 of the inner sleeve 20 engages the annular groove 46 of the nut 40, and the internal flange 48 of the nut engages the circumferential groove 26 of the inner sleeve. Accordingly, the external flange 24 of the inner sleeve 20 has a width that is slightly less than the width of the internal groove 46 of the nut, and the internal flange 48 of the nut has a width that is slightly less than the width of the circumferential groove 26 of the inner sleeve.

The inner diameter of the internal flange 48 of the nut is smaller than the outer diameter of the external flange 24 on the inner sleeve, and the external flange on the inner sleeve passes over the nut flange 48 to connect the inner sleeve to the nut. Therefore, to connect the one-piece inner sleeve 20 to the nut 40, the inner sleeve has sufficient flexibility to allow the inner sleeve to radially contract sufficiently to fit through the reduced diameter formed by the flange 48 of the nut 40. Accordingly, as discussed above, the inner sleeve 20 is formed into a plurality of segments by means of slots 22 that extend axially longitudinally of the sleeve from the rearward end. The slots form a flexible web 32 that is sufficiently flexible to allow the rearward end of the inner sleeve to resiliently deform radially to allow the interlock of the inner sleeve to connect with the interlock of the outer sleeve.

In the present instance, the interlock of the inner sleeve is an external interlock and the nut comprises an internal interlock. Therefore, the web provides sufficient flexibility to allow the inner sleeve to deform radially inwardly sufficiently to allow the interlock of the inner sleeve to pass through a reduced diameter portion of the internal interlock of the nut. Alternatively, the nut may comprise an external interlock and the inner sleeve may comprise a corresponding internal interlock. In such an embodiment, the web 32 provides sufficient flexibility to allow the inner sleeve to resilient deform radially outwardly to expand sufficiently to allow the internal interlock of the inner sleeve to fit over the external interlock of the nut. Furthermore, the web 32 is sufficiently resilient such that after the inner sleeve contracts inwardly to fit through the reduced diameter of the internal interlock of the nut, the inner sleeve resiliently expands outwardly so that the flange 24 nests within the groove 46 inside the nut as shown in FIGS. 1 and 5. Similarly, if the nut comprises an external interlock, after the inner sleeve 20 expands radially outwardly sufficiently to fit over an enlarged diameter of the external interlock, the inner sleeve resiliently contracts radially inwardly so that the internal interlock of the inner sleeve engages the external interlock of the nut.

Accordingly, the mounting device 10 is assembled as follows. Inner sleeve 20 is aligned with the nut so that the central axis of the nut is aligned with the central axis of the inner sleeve. In this way, the interlock of the nut is aligned with the interlock of the inner sleeve. The inner sleeve 20 is then displaced axially relative to the nut to drive the inner sleeve toward the nut. Additionally, the rearward end of the inner sleeve 20 is compressed inwardly so that the interlock of the inner sleeve fits within the interlock of the nut. Specifically, the inner sleeve is deformed radially inwardly so that the outer diameter of the circumferential flange is smaller than the reduced diameter of the annular flange 48 of the nut.

To effectuate contraction of the inner sleeve, the rearward face of the circumferential flange 24 is chamfered as shown in FIGS. 1 and 2. In this way, driving the inner sleeve 20 toward the nut 40 deforms the circumferential flange 24 radially inwardly as the chamfered edge engages the annular flange 48 of the nut. After the flange 24 passes through the reduced diameter bore of the internal flange 48, the flange 24 resiliently expands outwardly so that the flange 24 engages the annular groove 46 in the nut and the internal flange 48 engages the circumferential flange 26 of the inner sleeve.

The outer sleeve 50 is then threaded onto the nut 40 so that the outer sleeve overlies the inner sleeve 20 as shown in FIG. 1. In the present instance, the outer sleeve is threaded onto the nut a sufficient distance so that the mating frustoconical surfaces 24, 53 of the inner and outer sleeves do not sufficiently engage each other during assembly to cause the inner sleeve to deform radially inwardly. The assembled mounting device can then be placed onto a shaft 15 by sliding the shaft through the inner sleeve 20. Similarly, a machine element may be mounted onto the device 10 by inserting the outer sleeve 50 into the bore of the machine element 12 to that the head 44 of the nut 40 abuts the hub or sidewall of the machine element. The machine element 12 is mounted onto the device so that the bore of the machine element overlies the mating tapered surfaces of the inner and outer sleeves. Specifically, in the present instance more than half the width of portion of the machine element that engages the mounting device overlies the mating tapered surfaces of the inner and outer sleeves rather than overlying the rearward portion of the inner and outer sleeves.

To lock the machine element 12 onto the shaft 15, the nut 40 is rotated. As can be seen in FIG. 1, the wedging action of the inner and outer sleeves is provided by displacing the inner sleeve forward relative to the outer sleeve. Specifically, when the device is in a loosened position, the inner sleeve is located within the outer sleeve so that the major diameter of the inner sleeve frustoconical portion 23 is positioned within a portion of the outer sleeve bore having a diameter that is at least as great as the major diameter of the inner sleeve frustoconical portion. In other words, in the loosened position, the inner sleeve 20 does not contact the bore of the outer sleeve to provide a wedging or clamping force.

Rotating the nut 40 in a forward direction displaces the outer sleeve 50 rearwardly relative to the inner sleeve 20 so that the internal tapered surface of the outer sleeve is driven over the frustoconical surface 23 of the inner sleeve 20. Driving the outer sleeve rearwardly wedges the outer sleeve so that the outer sleeve deflects radially outwardly to expand the outer sleeve in the bore of the machine element 12 to lock onto the machine element. At the same time, the wedging force deflects the inner sleeve radially inwardly so that the inner sleeve contracts to lock the inner sleeve 20 onto the shaft 15.

To release the connection between the machine element, mounting device and shaft, the nut is simply rotated in a reverse direction. The reverse rotation displaces the outer sleeve forwardly relative to the inner sleeve. The forward relative displacement of the outer sleeve drives the major diameter of the outer sleeve internal tapered portion over the larger diameter portion of the frustoconical portion 23 of the inner sleeve, which in turn releases the wedging force provided by the interfering tapered surfaces. In this way, rotating the nut in the reverse direction loosens the outer sleeve from the machine element and loosens the inner sleeve from the shaft.

The angle of taper of the external surface of the inner sleeve 20 and the internal surface of the outer sleeve 50 is selected relative to the length of the threaded portion 52 of the outer sleeve. A shallower angle permits greater displacement of the outer sleeve 50 relative to the inner sleeve 20 with less expansion of the mounting device 10. Alternatively, a sharper angle reduces the relative displacement of the sleeves before expansion of the device.

As shown in FIGS. 1-5, the device 10 includes several optional features that can be incorporated into the device depending on the application. For instance, as shown in FIGS. 1, 3 and 5, the inner sleeve 20 may include a second circumferential groove or recess 34 at or adjacent to the forward end of the inner sleeve. Specifically, the second circumferential recess 34 is disposed adjacent an end opposite the end at which the interlock is formed. In the present instance, the recess 34 is formed in the web 32 of the inner sleeve. The recess 34 may be configured with sufficient depth and/or width to facilitate the web deforming elastically during the assembly process when the inner sleeve 20 is connected with the nut 40.

FIGS. 1-5 also illustrate an optional spacer sleeve, referred to as positioning sleeve 70, disposed between the nut 40 and the outer sleeve 50. The positioning sleeve 70 is a hollow substantially cylindrical ring having an internal surface sized and configured to cooperate with the external surface 53 of the outer sleeve 50. Specifically, the inner surface 72 is a cylindrical surface having a diameter slightly larger than the outer diameter of the outer sleeve 50. The positioning sleeve 70 may also comprise a retaining element to retain the positioning sleeve on the outer sleeve 50. For instance, in the present instance, the positioning sleeve 70 comprises an annular flange 76 projecting radially inwardly to form a reduced diameter opening. In this way, the annular flange operates as a stop impeding the sleeve from sliding forwardly past the rearward edge of the outer sleeve 50 when the device is assembled, as shown in FIGS. 1 and 5. Additionally, in the present instance, the positioning sleeve is a substantially solid ring without slits or other features so that the positioning sleeve is substantially radially inflexible to impede the positioning sleeve from deforming radially outwardly in a manner that would allow the flange 76 to be displaced radially outwardly past the outer diameter of the outer sleeve 50.

The positioning sleeve 70 is configured with sufficient width to position the hub of the machine element over the tapered surfaces of the inner and outer sleeves 20, 50 when the machine element has a narrow width. Specifically, the forward edge 75 of the positioning sleeve (see FIG. 5) extends outwardly from the head 44 of the nut so that the forward edge 75 engages the hub or sidewall of the machine element. In this way, the rearward end of the positioning sleeve abuts the head 44 of the nut 40 while the forward edge 75 engages the hub or sidewall of the machine element 12. Additionally, the positioning sleeve 70 overlies at least a portion of the threaded portion 55 of the outer sleeve 50 and at least a portion of the externally threaded portion 42 of the nut 40.

When the positioning sleeve is incorporated into the device 10, the device is assembled as follows. The inner sleeve 20 is connected to the nut 40 by driving the inner sleeve onto the nut as described above. The rearward end of the outer sleeve 50 is then inserted into the positioning sleeve. The inner sleeve/nut combination is then displaced axially relative to the outer sleeve/positioning sleeve combination until the internal threads of the outer sleeve engage the external threads of the nut. The device 10 is positioned onto a shaft 15 by inserting the shaft through the bore of the inner sleeve 20. A machine element 12 is then mounted onto the device by inserting the device into the bore of the machine element until the forward edge 75 of the positioning sleeve engages the sidewall or hub of the machine element. In this way, the machine element is positioned over the tapered surfaces of the inner and outer sleeve rather than just the threaded portion of the outer sleeve. Additionally, since the positioning sleeve abuts the head 44 of the nut, the positioning sleeve and nut combine to impede relative displacement of the machine element relative to the nut and the attached inner sleeve when the nut is rotated to tighten the device.

Referring now to FIGS. 6-10, an alternate embodiment of the mounting device described above is designated 110. The mounting device comprises an inner sleeve 20 and a nut 40 configured substantially similar to the inner sleeve and nut 40 described above in connection with the mounting device 10. The mounting further comprises an outer sleeve 150 and a positioning sleeve 170.

The inner surface of the outer sleeve 150 is configured to cooperate with the external surface 23 of the inner sleeve. The inner and outer sleeves have mating tapered surfaces that cooperate to wedge the outer sleeve outwardly while contracting the inner sleeve inwardly. More specifically, the inner surface of the outer sleeve 150 tapers toward the forward end at the same angle of taper as the frustoconical portion 23 of the inner sleeve 20. When the outer sleeve 150 is displaced rearwardly relative to the inner sleeve 20 (i.e. from right to left in FIG. 6), the confronting tapered surfaces of the inner and outer sleeves cooperate to expand the external cylindrical surface of the outer sleeve and contract the internal cylindrical surface of the inner sleeve.

In the present instance, the outer sleeve 150 comprises a threaded portion 155 configured to threadedly engage the threaded portion 42 of the lock nut 40. Specifically, the outer sleeve comprises an internally threaded section 155 adjacent the rearward end of the outer sleeve. To affect axial displacement of the outer sleeve relative to the inner sleeve, the nut 40 has external threads 42 that threadedly engage the threads 155 of the outer sleeve 150. Rotating the nut 40 displaces the outer sleeve axially relative to the nut. Accordingly, since the inner sleeve 20 is connected to the nut, the outer sleeve is displaced axially relative to the inner sleeve as the nut is rotated.

The outer sleeve 150 further comprises an external circumferential groove or recess 154 adjacent the rearward end of the outer sleeve. The positioning sleeve 170 is a substantially cylindrical ring having an internal surface configured to cooperate with the external surface of the outer ring 150. Specifically, in the present instance, the internal surface 172 of the positioning ring is a cylindrical surface having a diameter substantially similar to the reduced diameter section formed by the recess 154 on the outer sleeve 150. In this way, when the device is assembled, the positioning sleeve 170 is retained on the device 110 between the head of the nut 40 and the forward edge of the recess 154 formed on the outer surface of the outer sleeve. The assembly and operation of the mounting device 110 are substantially similar to the assembly and operation of the mounting device 10 described above.

Referring now to FIGS. 11-14 a second alternate embodiment of a mounting device is designated 210. The mounting device 210 comprises a locking nut 240, an inner sleeve 220, and outer sleeve 50 and a positioning ring 270. The outer sleeve 50 is substantially similar to the outer sleeve described above in connection with the first mounting device 10 described above. In this third embodiment, the interlock between the inner sleeve 220 and the nut 240 are reversed relative to the embodiments previously described.

In the present instance, the interlock of the inner sleeve 220 is configured to connect the inner sleeve to the nut 240 so as to allow the inner sleeve to rotate relative to the nut while substantially impeding axial movement of the inner sleeve relative to the nut. For example, the interlock comprises an annular flange 224 that extends around the internal diameter of the inner sleeve 220, projecting radially inwardly. Further, the interlock may comprise an annular groove 226 that extends around the internal diameter of the inner sleeve adjacent the annular flange 224.

The inner sleeve 220 is tubular in form having an internal bore that cooperates with the external surface of the shaft 15. Specifically, if the external surface of the shaft is tapered or frustoconical, the internal surface of the inner sleeve has a cooperating tapered or frustoconical surface. In the present instance, the shaft is cylindrical, and the inner sleeve 220 has a cylindrical bore with a diameter that corresponds to the diameter of the shaft 15. Preferably, the bore of the inner sleeve is slightly greater in diameter than the shaft 15 to permit free sliding movement of the inner sleeve 220 on the shaft 15 both axially and circumferentially.

As discussed further below, the inner sleeve 220 engages the shaft 15 by contracting so that the inner sleeve grips or clamps down onto the shaft. For this purpose, the inner sleeve 220 is formed into a plurality of segments by slots 222 that extend longitudinally through the sleeve from the forward end. The slots 222 allow radial deflection of the inner sleeve as the mounting device is tightened or released. Preferably, the slots terminate along a line spaced inwardly from the forward end of the inner sleeve 220. In this way, the forward portion of the inner sleeve 220 provides a flexible web that allows the inner sleeve to resiliently deform to interlock with the nut as discussed above in connection with the inner ring 20 of the first mounting device.

The inner sleeve 220 is adapted to fit within the outer sleeve 50. As shown in FIG. 11-14, the inner surface of the outer sleeve 50 is configured to cooperate with the external surface of the inner sleeve. The inner and outer sleeves have mating tapered surfaces that cooperate to wedge the outer sleeve outwardly while contracting the inner sleeve inwardly. More specifically, the inner surface of the outer sleeve 50 tapers toward the forward end at the same angle of taper as the frustoconical portion of the inner sleeve 220. When the outer sleeve 50 is displaced rearwardly relative to the inner sleeve 220 (i.e. from right to left in FIG. 11), the confronting tapered surfaces of the inner and outer sleeves cooperate to expand the external cylindrical surface of the outer sleeve and contract the internal cylindrical surface of the inner sleeve.

In the present instance, the outer sleeve comprises a threaded portion 55 configured to threadedly engage the threaded portion 242 of the lock nut 40. Specifically, the outer sleeve comprises an internally threaded section 55 adjacent the rearward end of the outer sleeve. To affect this displacement, as illustrated in FIGS. 1-5, the nut 240 has external threads 242 that threadedly engage the threads 55 of the outer sleeve 50. Rotating the nut 240 displaces the outer sleeve axially relative to the nut. Accordingly, since the inner sleeve 220 is connected to the nut, the outer sleeve is displaced relative to the inner sleeve as the nut is rotated.

The nut 240 has an internal bore that is larger than the diameter of the shaft 15. In addition, preferably the outer diameter of the nut is larger than the outer diameter of the outer sleeve 50. More specifically, the nut 240 has an enlarged head 244 that extends radially outwardly so that the diameter of the head is larger than the bore of the machine element. Therefore, the outer diameter of the head 244 is larger than the largest diameter of the outer sleeve 50. In this way, the head 244 of the nut 40 is configured so that if the head of the nut is abutted against the machine element, the head operates as a stop to impede displacement of the machine element relative to the nut. Additionally, as discussed above, the nut is connected to the inner sleeve in a manner that substantially impedes axial displacement of the inner sleeve relative to the nut. Therefore when the head 244 of the nut 240 abuts the side of the machine element, the head operates as a stop impeding axial displacement of the machine element relative to the inner sleeve. The mating tapers of the inner and outer sleeve are configured so that displacement of the outer sleeve relative to the inner sleeve imparts greater radial force than axial force. Therefore, the forces created by the cooperating tapers cause greater clamping force than axial forces. Because of this, tightening the locking nut causes the inner sleeve to clamp down on the shaft 15 with sufficient force to impede displacement of the inner sleeve relative to the shaft from the axial forces caused by the mating tapers with the inner and out sleeves are displaced relative to one another to tighten the device.

As discussed above, the nut 240 is connected to the inner sleeve 220 to impede substantial axial displacement between the nut and the inner sleeve. To provide such a connection, the nut comprises an interlock configured to cooperate with the interlock of the inner sleeve to provide a substantially irreversible or permanent connection that allows the inner sleeve to rotate relative to the nut while substantially impeding axial displacement of the inner sleeve relative to the nut. In the present instance, the nut comprises a circumferential flange 248 and a circumferential groove 246 configured to cooperate with the annular flange 224 and annular groove 226 of the inner sleeve 220. In the present instance, the groove 246 and flange 248 are formed at the forward end of the nut, forward of the threaded portion 242.

Configured in this way, during assembly, the inner sleeve 220 expands radially outwardly over the circumferential flange 248 of the nut as the inner sleeve is driven toward the nut. The inner sleeve then resiliently contracts to lock the inner sleeve onto the forward end of the nut 240.

As shown in FIG. 14, the device 210 may also include a positioning ring 270. The positioning sleeve 270 is a substantially cylindrical ring having an internal surface configured to cooperate with the external surface of the outer ring 50. Specifically, in the present instance, the internal surface 172 of the positioning ring is a cylindrical surface having a diameter substantially similar to the diameter of the external cylindrical surface of the outer sleeve 50. It should be noted that the positioning sleeve is retained between the head 244 of the nut 240 and the sidewall of the machine element 12. However, when the machine element is separate from the mounting device, the positioning ring may slide over the outer sleeve.

The assembly and operation of the mounting device 210 are substantially similar to the assembly and operation of the mounting device 10 described above.

The mounting devices described above are particularly effective to avoid damage to the shaft and the machine elements in case of catastrophic overload of the machine. A major advantage of the construction of the mounting devices is that they slip and protect other elements of the machine without damage to the shaft or the machine element. In the event of slippage due to excess loading, the unit itself may not be damaged and may be used without replacement or readjustment. The construction also enables the units to be fabricated from materials other than metal where the operating conditions are such as to limit the selection of the material used in fabricating the parts.

The use of a single-piece inner sleeve in conjunction with a single piece outer sleeve is particularly suited for situation in which precise rotary balance is required. In known devices incorporating a multiple piece inner or outer sleeve, the pieces comprising the multiple piece sleeve can move relative to one another when the device is tightened or loosened, thereby altering the rotational balance of the device. By eliminating the multiple-piece sleeve, the mounting devices described above reduce rotary imbalance during use. In this way, the devices can be circumferentially balanced during manufacture, and the devices will retain the balance during normal operation.

It will be recognized by those skilled in the art that changes or modifications can be made to the above-described embodiments without departing from the broad inventive concept of the invention. It should therefore be understood that this invention is not limited to the particular embodiments described herein but is intended to include all changes and modifications that are within the scope and spirit of the invention as set forth in the following claims.

We claim:

1. A device for coaxially mounting a machine element having a bore upon a shaft comprising:
    a nut comprising:
        an enlarged head;
        a first connector;
        a threaded portion overlying at least a portion of the first connector;
    an outer sleeve for engaging the machine element, comprising:
        an external surface configured to cooperate with the bore of the machine element;
        a tapered internal surface wherein the internal surface has a minor diameter adjacent a forward end of the outer sleeve and a major diameter spaced rearwardly from the forward end;
        at least one axial slot extending longitudinally along the outer sleeve to permit expansion of the external surface of the outer sleeve;
        an internally threaded portion configured to threadedly engage the threads of the nut;
    an inner sleeve for encircling the shaft, comprising:
        a tapered external surface corresponding in angle of taper to the tapered internal surface of the outer sleeve and having a minor diameter adjacent a forward end of the inner sleeve and a major diameter spaced rearwardly from the forward end of the inner sleeve;
a plurality of axial slots extending longitudinally and terminating adjacent the forward end of the inner sleeve;
an interior bore corresponding in diameter to the shaft; and
a second connector cooperable with the first connector to connect the inner sleeve with the nut to impede substantial axial displacement of the inner sleeve relative to the nut while allowing rotation of the inner sleeve relative to the nut;
a positioning sleeve extending over the rearward portion of the outer sleeve, wherein the positioning sleeve has a rearward edge abutting the enlarged head of the nut;
wherein the enlarged head of the nut is larger than the outer sleeve so that the enlarged head is configured to abut a sidewall of the machine element when the machine element is mounted on the device, and wherein rotating the nut in a first direction displaces the outer sleeve rearwardly relative to the nut, which displaces the major diameter of the external surface of the inner sleeve toward the minor diameter of the outer sleeve internal surface, thereby causing the inner sleeve to contract against the shaft and the outer sleeve to expand against the bore of the machine element, and wherein rotating the nut in a second direction displaces the outer sleeve forwardly relative to the nut, thereby loosening the inner sleeve from the shaft and the outer sleeve from the bore of the machine element.

2. The device of claim 1 wherein the inner sleeve comprises a circumferential recess adjacent the forward end of the inner sleeve, wherein at least a portion of the recess extends between forward terminal ends of the slots and the forward end of the inner sleeve.

3. The device of claim 2 wherein the first connector comprises a circumferential groove and the second connector comprises a flange extending radially inwardly, wherein the inner sleeve is sufficiently deformable to allow the second connector to fit over the first connector and wherein the inner sleeve is sufficiently resilient such that the inner sleeve resiliently deforms after flexing to displace the flange into the groove.

4. The device of claim 1 wherein the positioning sleeve is a cylindrical sleeve extending over a portion of the threaded portion of the outer sleeve.

5. The device of claim 1 wherein the positioning sleeve has a forward edge that abuts the sidewall of the machine element when the machine element is mounted on the device.

6. The device of claim 1 wherein the positioning sleeve comprises a retainer for retaining the positioning sleeve on the outer sleeve.

7. The device of claim 1 wherein the outer sleeve comprises a retainer for retaining the positioning sleeve on the outer sleeve.

8. The device of claim 1 wherein the outer sleeve is a one-piece sleeve comprising a plurality of slots forming a plurality of sections connected by a web that allows the outer sleeve to resiliently deflect radially.

9. A device for coaxially mounting a machine element having a bore upon a shaft comprising:

a one-piece inner sleeve for encircling the shaft, having a forward end and a rearward end, wherein the inner sleeve comprises:
a first connector at a first end;
a frustoconical external surface having a major diameter adjacent the first connector and a minor diameter spaced from the major diameter toward a second end of the inner sleeve;
an internal bore configured to cooperate with the shaft;
a recess extending around the inner sleeve at the second end remote from the first connector;
a nut comprising:
a threaded portion;
a second connector configured to cooperate with the first connector to connect the inner sleeve with the nut to allow rotation of the inner sleeve relative to the nut while substantially impeding axial movement of the inner sleeve relative to the nut;
an enlarged head;
an outer sleeve engaging the machine element comprising:
a frustoconical internal surface corresponding in angle of taper to the tapered external surface of the inner sleeve, and having a major diameter adjacent the rearward end and a minor diameter adjacent the forward end;
an external surface corresponding to the bore of the machine element; and
a positioning sleeve having an internal diameter sized to fit over the outer sleeve, wherein the positioning sleeve has a rearward edge abutting the enlarged head of the nut;
wherein rotation of the nut displaces the outer sleeve in one direction relative to the nut thereby displacing the minor diameter of the outer sleeve external surface toward the major diameter of the inner sleeve internal surface, thereby causing the internal bore of the inner sleeve to contract against the shaft and the external surface of the outer sleeve to expand against the bore of the machine element.

10. The device of claim 9 wherein the inner sleeve comprises an outer rim at the second end, wherein the recess extends around the rim to create a reduced diameter at the second end.

11. The device of claim 9 wherein the inner sleeve comprises a plurality of axial slots extending longitudinally along the inner sleeve and terminating adjacent the forward end of the inner sleeve, wherein the recess overlies at least a portion of the length of the inner sleeve between forward terminal ends of the slots and the forward end of the inner sleeve.

12. The device of claim 11 wherein the first connector comprises a circumferential groove and the second connector comprises a flange extending radially inwardly, wherein the inner sleeve is sufficiently deformable to allow the second connector to fit over the first connector and wherein the inner sleeve is sufficiently resilient such that the inner sleeve resiliently deforms after flexing to displace the flange into the groove.

13. The device of claim 9 wherein the first connector is configured to connect with the second connector to substantially permanently connect the inner sleeve with the nut.

14. The device of claim 9 wherein the positioning sleeve is a cylindrical sleeve extending over a portion of the threaded portion of the outer sleeve.

15. The device of claim 9 wherein the positioning sleeve has a forward edge that abuts the sidewall of the machine element when the machine element is mounted on the device.

16. The device of claim 9 wherein the positioning sleeve comprises a retainer for retaining the positioning sleeve on the outer sleeve.

17. The device of claim 9 wherein the outer sleeve comprises a retainer for retaining the positioning sleeve on the outer sleeve.

18. A method for mounting a machine element onto a shaft, comprising the steps of:
- providing an inner sleeve having forward and rearward ends, comprising:
  - a tapered external surface; and
  - a bore that is cooperable with the shaft;
- providing an outer sleeve comprising:
  - an internal bore that is tapered to cooperate with the external surface of the inner sleeve;
  - a threaded portion; and
  - an external surface cooperable with the bore of the machine element;
- providing a nut having an enlarged head and a threaded portion that is cooperable with the threaded portion of the outer sleeve;
- connecting the inner sleeve to the nut to impede substantial axial displacement of the inner sleeve relative to the nut while allowing rotation of the nut relative to the inner sleeve;
- positioning a positioning sleeve over a portion of the outer sleeve;
- positioning the inner sleeve and the outer sleeve between the shaft and the bore of the machine element so that a rearward edge of the positioning sleeve abuts the enlarged head of the nut and a forward edge of the positioning sleeve abuts a sidewall of the machine element without extending into the bore of the machine element;
- rotating the nut in a forward direction to drive the outer sleeve axially relative to the nut and the inner sleeve so that the tapered surface of the inner sleeve wedges apart the outer sleeve to connect the outer sleeve to the machine element and the inner sleeve to the shaft;
- wherein rotating the nut in a reverse direction drives the outer sleeve relative to the nut and inner sleeve to release the outer sleeve from the machine element and the inner sleeve from the shaft.

19. The method of claim 18 wherein the nut comprises a first interlocking element and the inner sleeve comprises a second interlocking element and the step of connecting the inner sleeve to the nut comprises driving the inner sleeve and the nut toward one another so that the inner sleeve deflects radially so that the second interlocking element rides over or under the first interlocking element.

20. The method of claim 19 wherein the outer sleeve resiliently displaces radially after the second interlocking element rides over or under the first interlocking element, thereby interlocking the first and second interlocking elements.

* * * * *